US 6,392,788 B1

(12) United States Patent
Yoon et al.

(10) Patent No.: US 6,392,788 B1
(45) Date of Patent: May 21, 2002

(54) OPTICAL FIBER AMPLIFIER

(75) Inventors: Soo-young Yoon, Yongin; Seong-taek Hwang, Pyeongtaek; Lars Johan Albinsson Nilsson, Suwon; Jeong-mee Kim, Yongin; Sung-jun Kim, Pyeongtaek; Rae-sung Jung, Yongin, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/196,765

(22) Filed: Nov. 20, 1998

(30) Foreign Application Priority Data

Nov. 20, 1997 (KR) ............................................. 97-61595
Feb. 21, 1998 (KR) ............................................. 98-5472

(51) Int. Cl.$^7$ ................................................ H01S 3/00
(52) U.S. Cl. ...................................... 359/341; 359/124
(58) Field of Search ................................ 359/341, 124

(56) References Cited

U.S. PATENT DOCUMENTS

| | | | | |
|---|---|---|---|---|
| 5,721,635 A | * | 2/1998 | Shigematsu et al. | 359/341 |
| 5,731,892 A | * | 3/1998 | DiGiovanni et al. | 359/341 |
| 5,742,427 A | * | 4/1998 | Kakui et al. | 359/341 |
| 5,835,259 A | * | 11/1998 | Kakui et al. | 359/341 |
| 5,838,487 A | * | 11/1998 | Nilsson et al. | 359/341 |
| 6,031,646 A | * | 2/2000 | Sniadower | 359/160 |

FOREIGN PATENT DOCUMENTS

| | | |
|---|---|---|
| JP | 5-7037 A | 1/1993 |
| JP | 7-147445 | 6/1995 |
| JP | 7-234423 | 9/1995 |
| JP | 09080492 | 3/1997 |
| JP | 09148659 | 6/1997 |
| JP | 10-215015 | 8/1998 |

OTHER PUBLICATIONS

M. Kakui et al., Low noise, high power optical amplifiers employing an improved hybrid Er–doped fiber configuration for WDM transmission, OAA' 96, SaA3–1/203, 1996.

J. Nilsson et al. "Simple Fain–Flattened Erbium–Doped Fiber Amplifier With A Wide Dynamic Rnage", Feb. 16, 1997, pp. 129–130.

P.F. Wysocki et al. "Dual–Stage Erbium–Doped, erbium/ Ytterbium–Codoped fiber Amplifier With Up To +26–dBm OUTPUT POWER AND A 17–nm Flat Spectrum", Nov. 1, 1996, pp. 1744–1746.

Search Report of French Patent Office (INPI), Sep. 19, 2000.

* cited by examiner

Primary Examiner—Mark Hellner
(74) Attorney, Agent, or Firm—Robert E. Bushnell, Esq.

(57) ABSTRACT

An optical fiber amplifier including a first optical fiber doped with erbium and phosphorous, for amplifying signal light excited by the erbium, a second optical fiber connected to one end of the first optical fiber, doped with erbium and aluminum, and having a gain spectrum slope opposite to the first optical fiber according to population inversion of the erbium, for amplifying signal light output by the first optical fiber, a pumping laser source connected to another end of the first optical fiber, for exciting the erbium of the first and second optical fibers, and a light coupler for coupling pumping light from the pumping laser source to the signal light and outputting the resultant light to the first optical fiber. Two types of EDFs (erbium doped fibers) having different gain spectrums are used, such that the gain spectrum of each of the EDFs actively varies with the input signal light power or pumping light power. Thus, an entirely flat gain is kept.

5 Claims, 6 Drawing Sheets

PUMPING POWER(mW)

OPTICAL FIBER AMPLIFIER

CLAIM OF PRIORITY

This application makes reference to, incorporates the same herein, and claims all benefits accruing under 35 U.S.C §119 from an application entitled Optical Fiber Amplifier earlier filed in the Korean Industrial Property Office on Nov. 20, 1997, and there duly assigned Ser. No. 97-61595 by that Office.

BACKGROUND OF THE INVENTION

1. Field of the Invention

The present invention relates to an optical fiber amplifier, and more particularly, to an optical fiber amplifier which obtains gain-flattened amplification characteristics by cascading optical fibers doped with different materials.

2. Description of the Related Art

Wavelength division multiplexing (WDM) transmission has emerged in the latter half of the 1990s as a means for increasing transmission capacity and efficiency by multiplexing and transmitting optical signals of different wavelengths. Thus, an optical fiber amplifier appropriate for the WDM transmission is required. However, an erbium-doped fiber (EDF) amplifier currently and widely in use shows different amplification degrees and noise figures for different wavelengths.

FIG. 1 is a block diagram of a conventional EDF amplifier, comprising a first isolator 100, a pumping laser source 102, a wavelength selective coupler (WSC) 104, an EDF 106, and a second isolator 108.

Their operations will now be described. First, the pumping laser source 102 generates pumping light of a central wavelength of 980 nm. The WSC 104 couples the pumping light to signal light of a 1500 nm band wavelength entering via its input port. The EDF 106 amplifies the signal light according to the pumping light incident from the WSC 104. That is, the pumping light excites erbium ions of ground-state in the EDF, and the signal light is amplified by stimulated emission of the excited erbium. The amplified optical signal is output via the second isolator 108. The first and second isolators 100 and 106 prevent the signal light from being reflected by elements such as input and output connectors 110 and 112 and reentering the EDF.

However, such a conventional optical fiber amplifier has a problem in that signal light of different wavelengths does not provide flattened gains. That is, when input signal channels 1, 2, 3 and 4 of equal powers are incident, the conventional optical fiber amplifier outputs signal channels having different powers at different wavelengths.

In order to solve the above problem, the prior art uses filters or changes the configuration of EDFs. However, use of the filters increases costs and increases the size of the conventional optical fiber amplifier. The above-described methods result in a reduction in gain since they flatten output powers on the basis of the minimum power among the output powers at different wavelengths. The use of EDFs doped with a material having a different basic composition, such as fluoride, enlarges a gain flattening band, but reduces gains and shows characteristics unstable due to environmental influences.

SUMMARY OF THE INVENTION

To solve the above problems, it is an object of the present invention to provide an optical fiber amplifier having a flattened gain by cascading EDFs to which different materials are added.

Accordingly, to achieve the above object, there is provided an optical fiber amplifier comprising: a first optical fiber doped with erbium and phosphorous, for amplifying signal light excited by the erbium; a second optical fiber connected to one end of the first optical fiber, doped with erbium and aluminum, and having a gain spectrum slope opposite to the first optical fiber according to population inversion of the erbium, for amplifying signal light output by the first optical fiber; a pumping laser source connected to the other end of the first optical fiber, for exciting the erbium of the first and second optical fibers; and a light coupler for coupling pumping light from the pumping laser source to the signal light and outputting the resultant light to the first optical fiber.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein.

DESCRIPTION OF THE PREFERRED EMBODIMENTS

Figure 1:
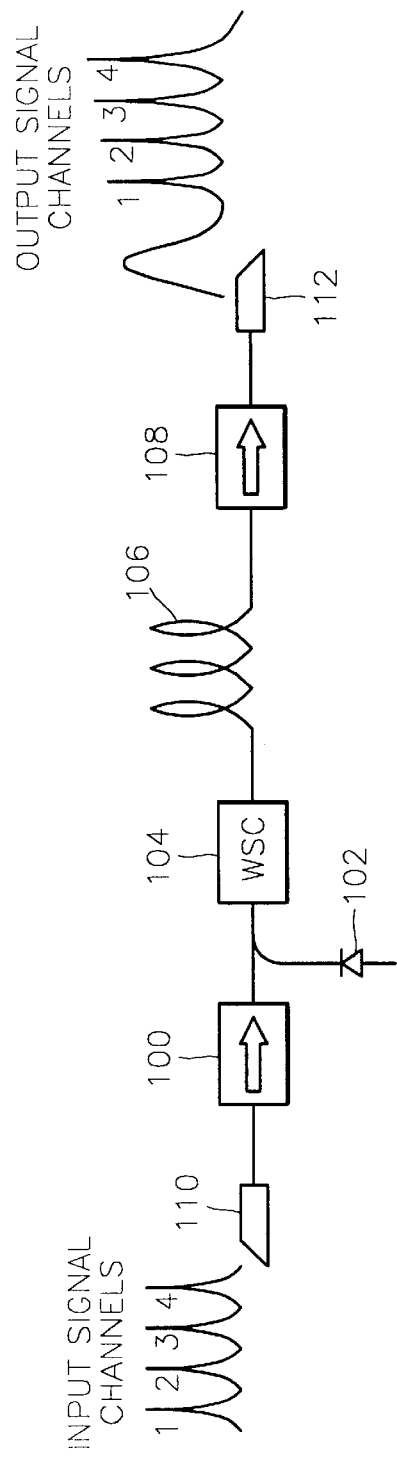
FIG. 1 is a block diagram of a conventional optical fiber amplifier.
Figure 2:
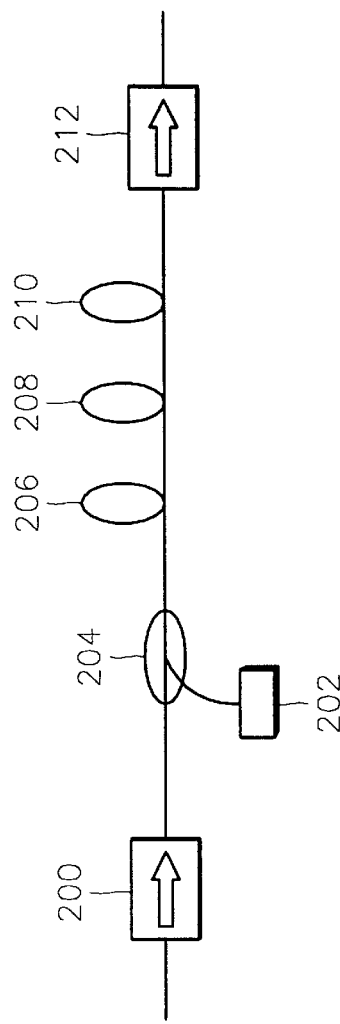
FIG. 2 is a block diagram of an optical fiber amplifier according to the present invention.

Referring to FIG. 2, an optical fiber amplifier includes a first isolator 200, a pumping laser source 202, a wavelength selective coupler (WSC) 204 connected to the first isolator 200 and the pumping laser source 202, a buffer EDF 206, EDFs 208 and 210, and a second isolator 212.

EDF 208 is an optical fiber doped with erbium (Er) and phosphorous (P), or an optical fiber doped with Er, aluminum (Al), and P. Buffer EDF 206 and EDF 210 are optical fibers doped with Er and Al, hwever, it is not necessary that buffer EDF 206 be doped with Al. It is preferable that buffer EDF 206 is an optical fiber which can reduce splice loss caused by the mode field diameter difference between the WSC 204 and the EDF 208. Buffer EDF 206 is short so as not to affect the gain characteristics of the entire amplifier-. The concentrations of Er and Al of buffer EDF 206 may be equal to or different from those of EDF 210. Further, buffer EDF 206 may be omitted since it reduces the splice loss but has no effect on the gain flatness of the optical fiber amplifier.

The operations of the components of the optical amplifier of FIG. 2 will now be described. First, several channel signal lights are incident upon WSC 204 via first isolator 200 which prevents amplified spontaneous emission from each EDF from flowing backward and being reflected. The incident signal lights are coupled to a pumping laser from the pumping laser source 202, such as a laser diode, for supplying power having a central wavelength of 980nm and necessary for amplification, by the WSC 204. The signal lights are amplified by the EDFs 208 and 210.

EDF 208 amplifies more signal lights of a relatively short wavelength than other signal lights of wavelengths between 1540 nm and 1560 nm. EDF 210 amplifies more signal lights of a relatively long wavelength than other signal lights of wavelengths between 1540 nm and 1560 nm. This results from the gain spectrum characteristics depending on the wavelengths of the EDFs 208 and 210.

Figure 3A:
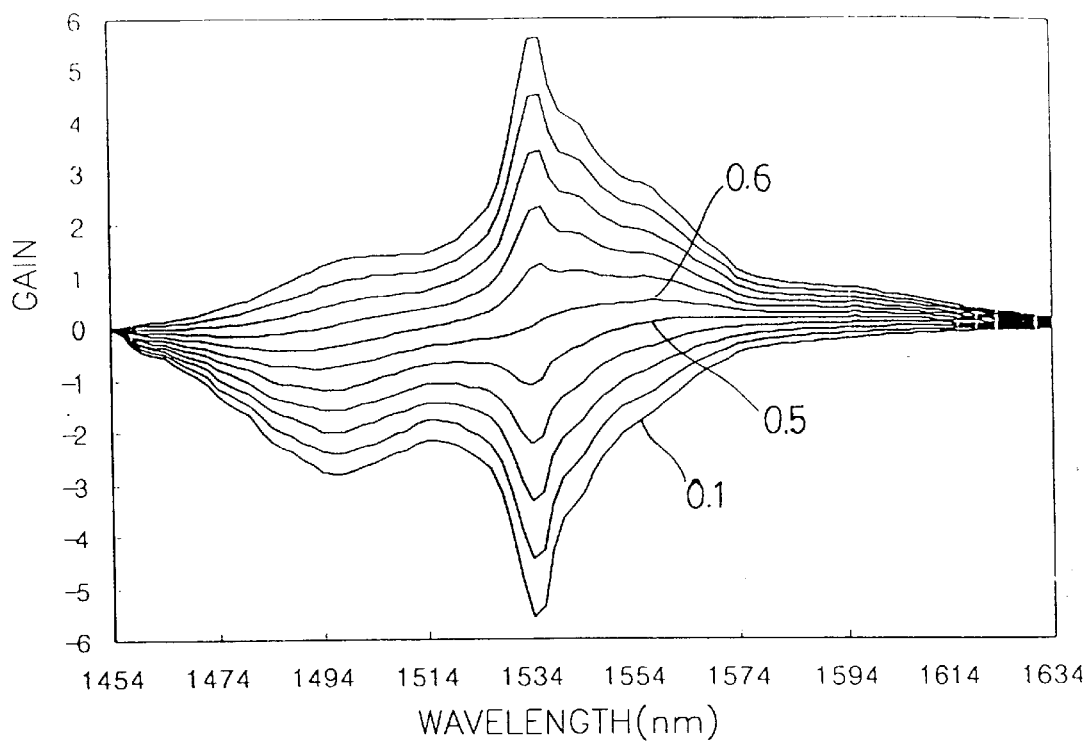
FIGS. 3A and 3B show gain spectrums according to the population inversion distributions of the first and second EDFs of FIG. 2.
Figure 3B:
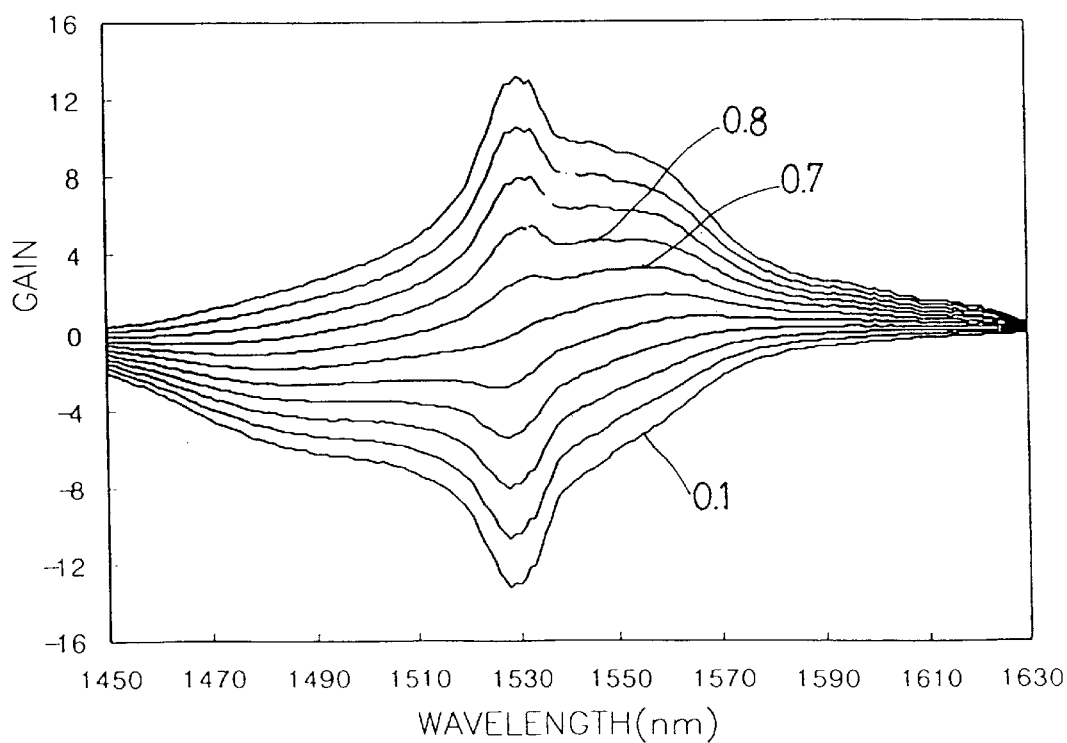

FIG. 3A shows a gain spectrum depending on the population inversion distribution of EDF 208. FIG. 3B shows a gain spectrum depending on the population inversion distribution of EDF 210. Each of these gain spectrums is shown as the ratio of population inversion increased in units of 0.1 between 0 and 1. In FIGS. 3A and 3B, the gain characteristics of the EDFs at different wavelengths vary with the ratio of population inversion.

That is, in FIG. 3A, the gain of EDF 208 becomes lower with an increase in wavelength between 1540 nm and 1560 nm when the ratio of population inversion is 0.6 or larger. When the ratio of population inversion is 0.5 or smaller, the gain thereof becomes larger with an increase in wavelength. However, where the gain increases as the wavelength becomes longer, EDF 208 is not desirable as an amplifier since its gain per unit length is 0.5 dB/m or less, i.e., its amplification level is low. EDF 208 is thus appropriate when the ratio of population inversion is 0.6 or larger. In this case, the amplification gain of EDF 208 becomes higher in short wavelengths rather than long ones.

In FIG. 3B, the gain of EDF 210 becomes lower as the wavelength becomes longer, in the same wavelength range as in FIG. 3A, when the ratio of population inversion is 0.8 or larger. When the ratio of population inversion is 0.7 or less, the gain becomes higher as the wavelength becomes longer. Thus, in order to increase the gain at long wavelengths relatively reduced by EDF 208, it is preferable that the ratio of population inversion of EDF 210 is 0.7 or less. If the ratios of population inversion used for EDFs 208 and 210 are both between 0.6 and 0.7, pumping laser power becomes higher and signal light power becomes lower in EDF 208, causing the ratio of population inversion to be larger. On the other hand, in EDF 210, the pumping light power becomes lower and the signal light power becomes higher, thus causing a decrease in the ratio of population inversion. An optical fiber amplifier having an entirely flat gain can be thus obtained.

After being amplified, the signal light is output via the second isolator 212 for preventing backward flow of forward spontaneous emission.

Figure 4:
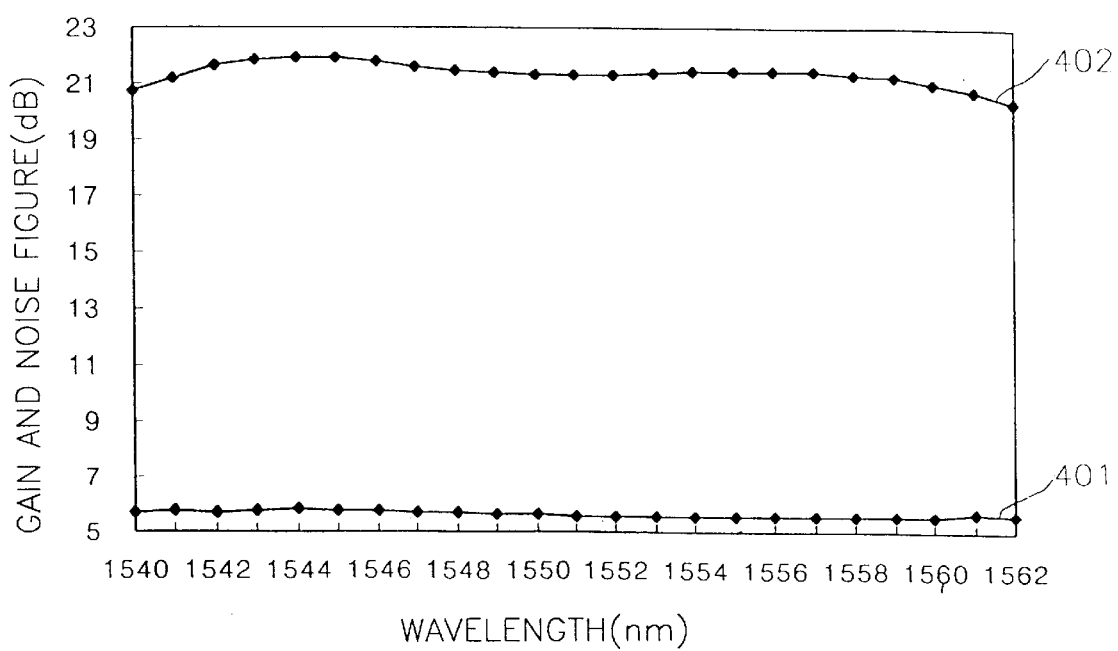
FIG. 4 is a graph showing gains and noise figures vs. wavelengths when four channel signal lights are multiplexed and input to the optical fiber amplifier of FIG. 2.

FIG. 4 is a graph showing gain and noise figures vs. wavelengths when four channel signal lights respectively having wavelengths of 1542 nm, 1548 nm, 1554 nm, and 1560 nm are input to the optical fiber amplifier of FIG. 2. Variations in the gain and noise figure are flattened within +0.5 dB at wavelengths between 1542 nm and 1560 nm. Reference numerals 401 and 402 represent noise figures and gains, respectively.

Figure 5:
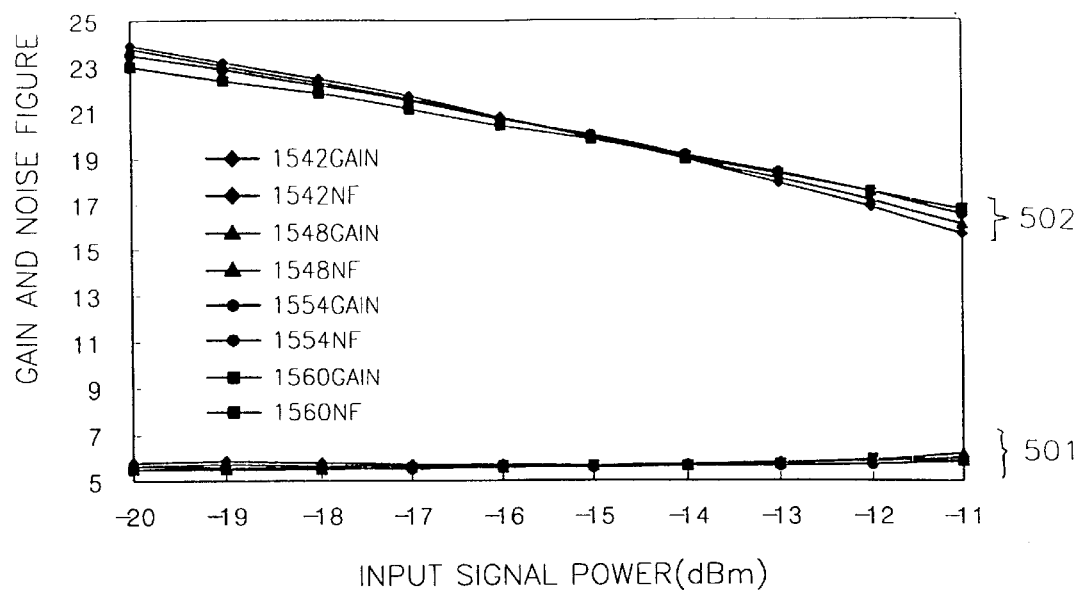
FIG. 5 is a graph showing gains and noise figures measured as signal light powers, for different channels, are changed while pumping light powers are kept constant.

FIG. 5 is a graph showing gains and noise figures measured as the powers of the abovedescribed four-channel signal lights are changed from 20 dBm to −1 dBm while pumping light powers are kept constant. As shown in FIG. 5, variations in the gain and noise figure are flattened within ±0.5 dB. Reference numerals 501 and 502 represent the noise figure and the gain, respectively.

Figure 6:
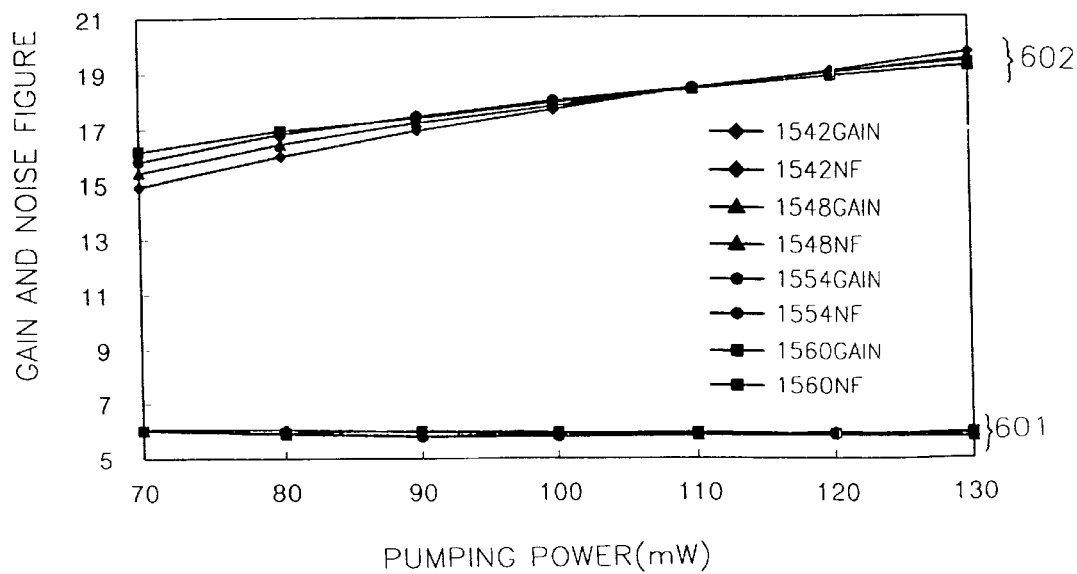
FIG. 6 is a graph showing gains and noise figures measured as pumping light powers are changed while signal light powers for four channels are kept constant.

FIG. 6 is a graph showing gains and noise figures measured as pumping light powers are changed from 70 mW to 130 mW while the four channel signal light powers are kept constant. As shown in FIG. 6, variations in the gain and noise figure arc flattened within ±0.5 dB. Reference numerals 601 and 602 represent the noise figure and the gain, respectively.

Figure 7:
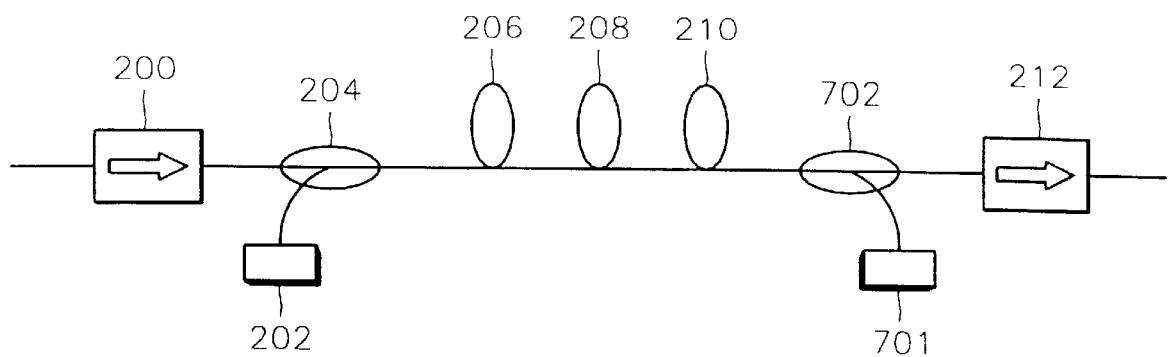
FIG. 7 is a block diagram of an optical fiber amplifier having a bidirectional pumping laser source, according to the present invention.

FIG. 7 is a block diagram of an optical fiber amplifier configured by adding a second pumping laser source 701 and a second WSC 702 to the optical fiber amplifier of FIG. 2 to achieve bidirectional pumping. The remaining elements are the same as those of FIG. 2.

Figure 8:
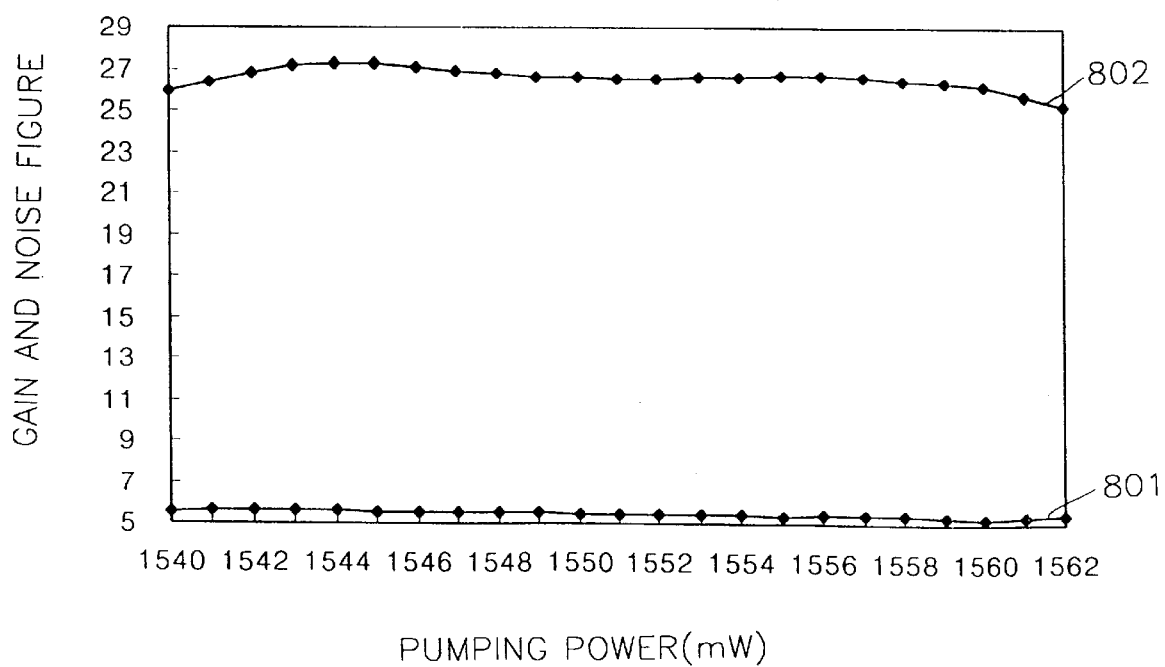
FIG. 8 is a graph showing gains and noise figures vs. wavelengths when four channel signal lights are incident upon the optical fiber amplifier of FIG. 7.

FIG. 8 is a graph showing gains and noise figures vs. wavelengths when four channel signal lights having wavelengths of 1542 nm, 1548 nm, 1554 nm and 1560 nm are incident upon the optical fiber amplifier of FIG. 7. As shown in FIG. 8, variations in the gain and noise figure are flattened within ±0.5 dB at wavelengths between 1542 nm and 1560 nm. Reference numerals 801 and 802 represent noise figures and gains, respectively.

Figure 9:
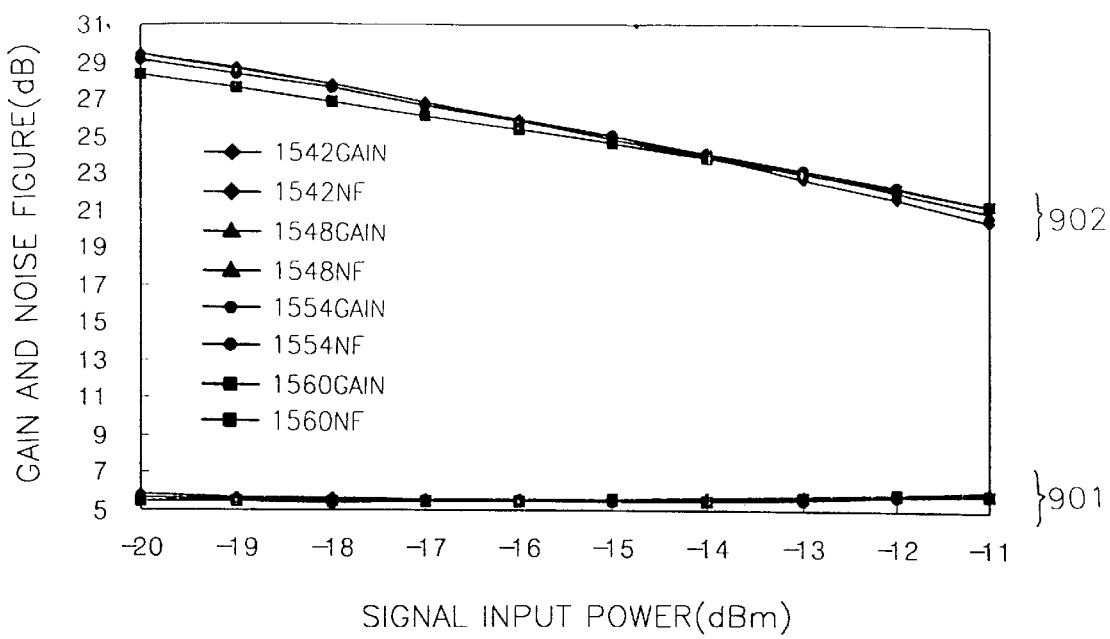
FIG. 9 is a graph showing gains and noise figures measured as signal light powers, for different channels, are changed while pumping light powers are kept constant.

FIG. 9 is a graph showing gains and noise figures measured as the powers of the above-described four-channel signal lights are changed from −20 dBm to −11 dBm while pumping light powers are kept constant. As shown in FIG. 9, variations in the gain and noise figure are flattened within ±0.5 dB. Reference numerals 901 and 902 represent the noise figure and the gain, respectively.

Figure 10:
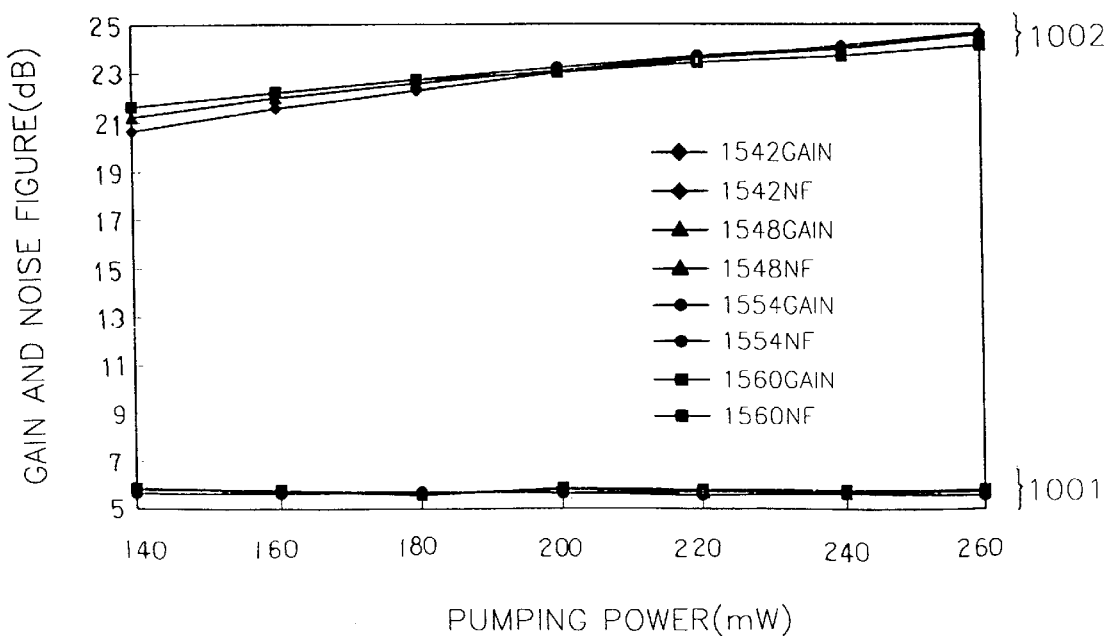
FIG. 10 is a graph showing gains and noise figures measured as pumping light powers are changed while signal light powers for four channels are kept constant.

FIG. 10 is a graph showing gains and noise figures measured as pumping light powers are changed from 140 mW to 260 mW while the four channel signal light powers are kept constant. As shown in FIG. 10, variations in the gain and noise figure are flattened within ±0.5 dB. Reference numerals 1001 and 1002 represent the noise figure and the gain, respectively.

When passive elements such as filters are used, the gain flatness is changed with the signal light power or the pumping light power. However, the present invention uses two types of EDFs having different gain spectrums, such that the gain spectrum of each of the EDFs actively varies with the input signal light power or pumping light power. Thus, an entirely flat gain can be maintained.

What is claimed is:

1. An optical fiber amplifier comprising:
    a first optical fiber doped with erbium and phosphorous, for amplifying signal light excited by the erbium;
    a second optical fiber connected to one end of the first optical fiber, doped with erbium and aluminum, and having a gain spectrum slope opposite to the first optical fiber according to population inversion of the erbium, for amplifying signal light output by the first optical fiber;
    a pumping laser source connected to another end of the first optical fiber, for exciting the erbium of the first and second optical fibers; and
    a light coupler for coupling pumping light from the pumping laser source to the signal light and outputting the resultant light to the first optical fiber; and
    a buffer fiber for connecting the light coupler to the first optical fiber to reduce splice loss between the first optical fiber and the light coupler, said buffer fiber having a short length characterized in that said buffer fiber does not effect the gain flatness of the optical fiber amplifier.

2. The optical fiber amplifier as claimed in claim 1, wherein the first or second optical fiber has a population inversion ratio of the erbium between 0.6 and 0.7.

3. The optical fiber amplifier as claimed in claim 1, wherein the buffer fiber is an optical fiber doped with erbium and aluminum.

4. The optical fiber amplifier as claimed in claim 1, further comprising a second pumping laser source connected to the second optical fiber to increase the power of the pumping light.

5. The optical fiber amplifier as claimed in claim 1, wherein the first optical fiber is an optical fiber further doped with aluminum.

* * * * *